United States Patent [19]

Alt et al.

[11] 4,084,164

[45] Apr. 11, 1978

[54] INK COLLECTOR IN INK JET PRINTER

[75] Inventors: Richard Curtis Alt, Vestal, N.Y.; Francis James Perry, Morgan Hill, Calif.

[73] Assignee: International Business Machines Corporation, Armonk, N.Y.

[21] Appl. No.: 810,345

[22] Filed: Jun. 27, 1977

[51] Int. Cl.[2] .............................................. G01D 15/18

[52] U.S. Cl. .............................................. 346/75

[58] Field of Search .............................................. 346/75

[56] References Cited

U.S. PATENT DOCUMENTS

| | | | |
|---|---|---|---|
| 3,798,656 | 3/1974 | Lowy et al. | 346/75 X |
| 3,836,914 | 9/1974 | Duffield | 346/75 |
| 3,882,508 | 5/1975 | Stoneburner | 346/75 |
| 3,955,203 | 5/1976 | Chocholaty | 346/75 |

*Primary Examiner*—George H. Miller, Jr.

[57] ABSTRACT

An ink jet printer employs a wire mesh gutter electrode assembly and a wire mesh high voltage electrode, each having angled or skewed configurations geometrically related for providing a relatively narrow constricted path for ink droplets, so that charged and partially charged droplets, which are not used for imprinting, traverse a short path and are effectively captured and collected for recirculation and use in the ink recording process.

4 Claims, 3 Drawing Figures

INK COLLECTOR IN INK JET PRINTER

CROSS-REFERENCE TO RELATED APPLICATION

U.S. Pat. No. 3,955,203 entitled "High Voltage Deflection Electrode Apparatus for Ink Jet", which issued May 4, 1976 on application Ser. No. 543,851 to W. L. Chocholaty, and is assigned to the same assignee, discloses an ink jet apparatus employing a high voltage electrode formed as a fine screen interposed between two rows of ink jet streams. Additional screen electrodes act in combination with the high voltage electrode to establish an electrostatic field that deflects charge droplets to gutter assemblies for recycling of the ink.

BACKGROUND OF THE INVENTION

1. Field of the Invention

This invention relates to ink jet printers, and in particular to an improved collector means for capturing ink droplets not used for imprinting the record.

2. Description of the Prior Art

Presently known ink jet printers, such as described in U.S. Pat. No. 3,955,203 incorporate a gutter assembly for collecting those charged ink droplets that are not selected for imprinting, or those partially charged droplets that have been misdirected or displaced from the path of the ink stream in the direction of the medium or paper. It is apparent that it would be desirable to collect a maximum amount of the ink not used for imprinting, and that the ink is recycled for further use. In prior art machines, gutters and deflection plates are provided for this purpose but are not deemed to be optimally efficient. Ink droplets that are spuriously deflected or misplaced, such as those that are only partially charged, may cause spotting or distorted images on the record, or may splatter against the electrodes resulting in ink mist and other deleterious conditions.

SUMMARY OF THE INVENTION

An object of this invention is to provide a novel and improved ink collection means in an ink jet printer.

Another object of this invention is to provide an ink jet printer in which background spots on the record paper are significantly reduced.

Another object is to provide an ink jet printer in which ink droplets are effectively collected and recycled, and thereby do not contribute to clogging and splattering.

According to this invention, an ink jet printer incorporates gutter electrodes having inner wall portions that are disposed at a predetermined angle or skew, and a high voltage electrode having angled faces parallel and opposite to the wall portions of the gutter electrodes. The gutter electrodes and the high voltage electrode are formed from a wire screen or mesh which allows passage of misplaced or misdirected ink droplets to a cavity, from which these droplets are siphoned away to an ink reservoir or ink source for further use.

BRIEF DESCRIPTION OF THE DRAWINGS

The invention will be described in greater detail with reference to the drawing in which.

Similar numerals refer to similar elements throughout the drawing.

DESCRIPTION OF THE PREFERRED EMBODIMENT

Figure 1:
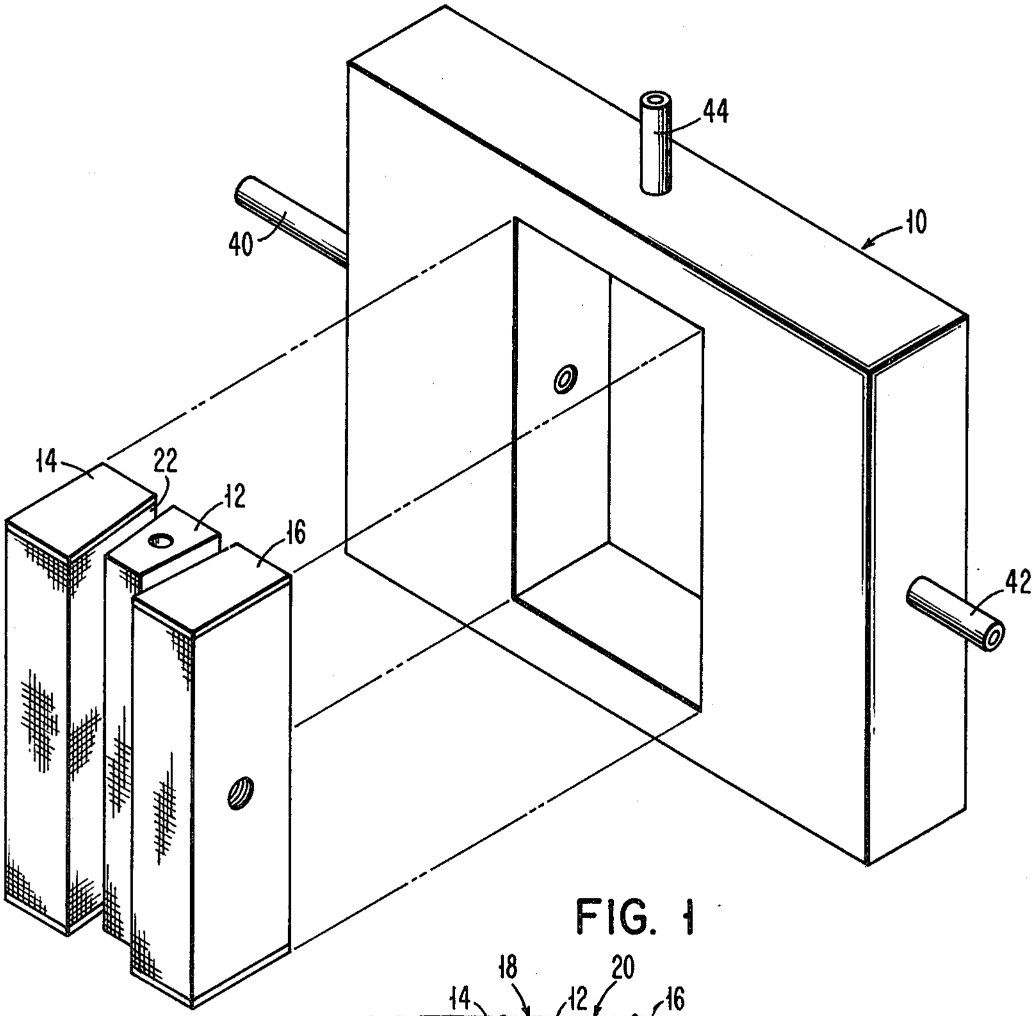
FIG. 1 is a three-dimensional representation of an electrode assembly employed for ink collection in an ink jet printer in accordance with this invention.

With reference to the drawing, an electrode assembly for use in an ink jet printer includes a housing 10 in which a high voltage electrode 12 is interposed between gutter electrodes 14 and 16. Each electrode is formed from a fine wire mesh of approximately 0.005 inch thickness and of 0.5 micron fineness, by way of example.

During operation of the ink jet apparatus, streams of charged and uncharged ink droplets 17 are directed in spaced rows through cavities 18 and 20 formed between wall portions 22, 24 of the gutter electrodes 14, 16 and opposing faces 26, 28 of the high voltage electrode 12. An electrostatic field is generated in the cavity areas 18, 20 as a result of the difference in potential between the high voltage electrode 12 and the gutter electrodes 14, 16 which may be at ground or zero potential. The uncharged droplets continue in their path through the cavity areas to a record medium or paper (not shown) to form an imprint or image thereon.

The gutter electrode wall portions 22 and 24 and the faces 26 and 28 of the high voltage electrode 12 are in juxtaposition and define the configurations of the cavities 18 and 20. The wall portions 22 and 24 and the faces 26 and 28 are formed angularly relative to the direction of the streams of ink droplets, so that the cavities 18 and 20 present a very narrow constricted passage for the streams of ink droplets. Thus, at the point of entry of the ink streams into the cavities 18 and 20, the ink is closest to the high voltage electrode 12 and spaced from the gutter electrodes 14, 16 whereas at the point of exit of the ink streams from the cavities 18, 20 en route to the paper, the ink is closest to the gutter electrodes 14 and 16 and spaced away from the high voltage electrode 12.

Figure 2A:
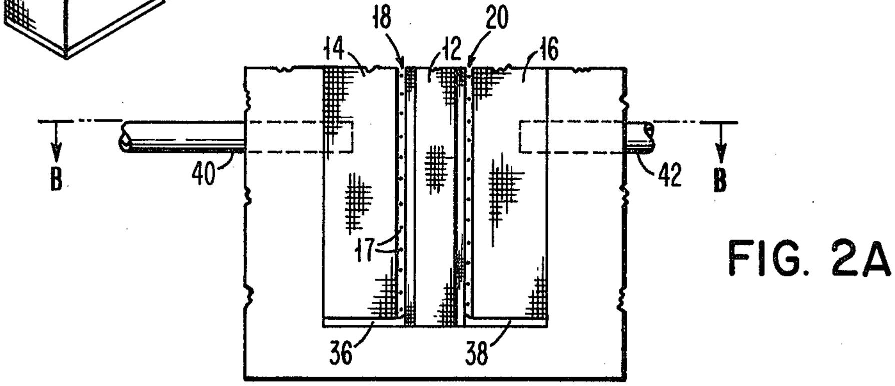
FIG. 2A is a side section view, partly cut away, of the electrode assembly depicted in FIG. 1.
Figure 2B:
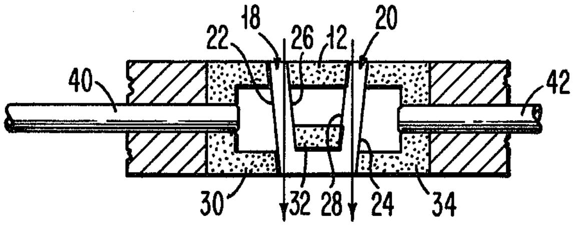
FIG. 2B is a top section view taken along lines B—B of FIG. 2A.

In a preferred embodiment, the gutter wall portion 22 and the opposing high voltage electrode face 26 are substantially parallel and are spaced closely. The angle of the gutter wall portion 22, at the cavity exit and the high voltage electrode face 26 at the cavity entrance, relative to the direction of the ink stream towards the paper is preferably in the range of 4° to 8°. Similarly, the gutter wall portion 24 and the opposing face 28 of the high voltage electrode are parallel and closely spaced and form the same angle with relation to the ink stream, but in an opposing direction, as illustrated in FIG. 2B.

The electrode assemblies 12, 14, 16 are formed from a fine wire mesh that encompasses supporting elements 30, 32, 34 made of Teflon, by way of example. The electrodes with the supporting elements are mounted within a recess in the housing 10.

Charged or partially charged ink droplets 17 that are deflected from the main streams of ink traveling towards the paper impinge on the wire screens of the grounded gutter electrodes and drop, by force of gravity, to receptacle portions 36, 38 of the gutter electrodes 14, 16 respectively. The deflected ink is removed, by vacuum means, for example, through tubes 40 and 42 and drawn to an ink reservoir for recycling. An additional tube 44 is coupled to the high voltage electrode 12 to provide a passage for accumulated ink mist, gathered by a fine mist screen, as described in the aforementioned U.S. Pat. No. 3,955,203.

By virtue of the short path and narrow channel allowed for passage of the ink between the gutter electrodes and the high voltage electrode, the strength of the applied electrostatic field is effectively maximized, thereby enhancing control of the movement of the multiplicity of rows of ink streams. As a result, aerodynamic effects are minimized and stability and integrity of the ink streams are improved. The narrow channel and the applied field strength allow the capture and collection of ink droplets that are only slightly partially charged. Also, the introduction of contaminants is significantly reduced. Along with the improved short path and applied electrostatic field, the charge voltage and deflection field are minimized, which results in a reduced amount of undesirable partial charge, hence minimizing the misplacement of drops which are not captured by the collector. In addition, the invention affords an improvement in image resolution and a savings in ink use. Furthermore, as a result of the narrow channel configuration, there is a significant reduction in splashing of the ink.

We claim:

1. An ink jet printer wherein rows of streams of selectively charged ink droplets are directed towards a record medium comprising:

a gutter electrode assembly having wall portions;

a high voltage electrode disposed between said gutter wall portions and having faces in juxtaposition with said wall portions;

said gutter electrode assembly and high voltage electrode being at different electrical potentials for generating an electrostatic field;

said wall portions and faces of said electrodes being skewed at a predetermined angle relative to the paths of said ink streams and forming narrow channels for passage of said ink droplets, so that the ink droplets pass close to said high voltage electrode upon entry into said channels and the ink droplets that are exiting from said channels pass close to the gutter electrodes.

2. An ink jet printer as in claim 1, wherein said gutter assembly and said high voltage electrode are formed with fine screen wire mesh.

3. An ink jet printer as in claim 1, wherein said predetermined angle of skew is between 4° and 8° relative to the direction of the rows of streams of ink droplets.

4. An ink jet printer as in claim 1, wherein said ink droplets are confined to a very narrow area so that a relatively low charge and deflection voltage is utilized.

* * * * *